United States Patent
Korcz

[11] Patent Number: 6,098,945
[45] Date of Patent: Aug. 8, 2000

[54] MOUNTING BRACKET AND SUPPORTING BRACE

[75] Inventor: Krzysztof Wojciech Korcz, Grager, Ind.

[73] Assignee: Hubbell Incorporated, Orange, Conn.

[21] Appl. No.: 09/040,935

[22] Filed: Mar. 19, 1998

[51] Int. Cl.[7] .......................... B42F 13/00; E04G 25/00; F16L 5/00; H02G 3/08
[52] U.S. Cl. ...................... 248/343; 248/906; 248/200.1; 248/57; 220/3.9
[58] Field of Search ................................... 248/161, 157, 248/200.1, 57, 343, 544, 27.1, 656, 669, 309.1, 318, 214, 247, 298.1, 300, 220.21, 220.22, 223.91, 225.11; 220/3.9, 3.2, 3.4; 174/63, 48; 29/432

[56] References Cited

U.S. PATENT DOCUMENTS

| | | | |
|---|---|---|---|
| Re. 33,147 | 1/1990 | Reiker | 248/200.1 |
| 1,564,609 | 12/1925 | Morgenstern | 248/343 |
| 1,567,863 | 12/1925 | Sargent et al. | 174/57 |
| 1,568,279 | 1/1926 | Herskovitz | 248/343 |
| 1,617,184 | 2/1927 | Spott | 248/343 |
| 1,659,404 | 2/1928 | Lipschultz | 248/343 |
| 1,699,414 | 1/1929 | Weinstein | 248/343 |
| 1,782,791 | 11/1930 | Nielson | 248/343 |
| 1,812,756 | 6/1931 | Riggs . | |
| 1,901,235 | 3/1933 | Glowacki | 248/343 |
| 1,906,197 | 4/1933 | Mangin | 220/3.9 |
| 1,916,719 | 7/1933 | Dover et al. | 160/345 |
| 1,982,957 | 12/1934 | Knell | 248/906 |
| 2,023,083 | 12/1935 | Knell | 248/906 |
| 2,140,861 | 12/1938 | Steketee | 248/27.1 |
| 2,191,613 | 2/1940 | Ericsson | 292/350 |
| 2,233,334 | 2/1941 | Austin, Jr. | 248/57 |
| 2,295,333 | 9/1942 | Clark . | |
| 2,316,389 | 4/1943 | Atkinson | 248/300 |
| 2,528,418 | 10/1950 | Buckels . | |
| 2,670,919 | 3/1954 | Esoldi . | |
| 2,713,983 | 7/1955 | Kay . | |
| 2,732,162 | 1/1956 | McKinley . | |
| 2,770,436 | 11/1956 | Linhardt, Jr. | 248/57 |
| 2,788,188 | 4/1957 | Smith et al. | 174/63 |
| 2,809,002 | 10/1957 | Rudolph . | |
| 2,824,167 | 2/1958 | Bauer | 174/63 |
| 2,917,263 | 12/1959 | Appleton et al. | 248/217.3 |
| 2,925,236 | 2/1960 | Cook et al. | 248/276 |
| 2,930,564 | 3/1960 | Maier | 248/200.1 |
| 2,945,661 | 7/1960 | Appleton | 240/205 |
| 2,963,253 | 12/1960 | Maier et al. | 248/298.1 |
| 2,964,279 | 12/1960 | Galloway . | |
| 3,059,045 | 10/1962 | Swartwood | 174/53 |
| 3,104,087 | 9/1963 | Budnick et al. . | |
| 3,214,126 | 10/1965 | Roos | 248/318 |
| 3,425,655 | 2/1969 | Cogdill | 248/343 |
| 3,518,421 | 6/1970 | Cogdill | 240/85 |
| 4,037,098 | 7/1977 | Kowalski | 240/78 R |
| 4,039,135 | 8/1977 | Schenk | 248/214 |
| 4,050,603 | 9/1977 | Harris et al. | 220/3.9 |
| 4,062,512 | 12/1977 | Arnold . | |
| 4,244,501 | 1/1981 | Ingram | 224/324 |

(List continued on next page.)

*Primary Examiner*—Anita M. King
*Assistant Examiner*—Michael Nornberg
*Attorney, Agent, or Firm*—Jerry M. Presson; Thomas P. Hilliard; Alfred N. Goodman

[57] ABSTRACT

A supporting structure, including a bracket brace and a bracket is disclosed. Preferably, the brace has an inside section and an outside section that move relative to each other. A portion of the inside section can be positioned completely within the outside section and each of the inside and outside sections have a pair of vertical portions. The brace also has a slot extending through the inside and outside sections. The bracket is coupled to the inside section of the brace and to each of the vertical portions of the outside sections of the brace. The bracket also has a coupling members in the form of threaded openings to secure a supported member; such as an electrical junction box, against the brace to prohibit relative movement between the brace and the bracket. The brace and bracket allow new, heavier lighting fixtures and ceiling fans to be safely supported.

27 Claims, 6 Drawing Sheets

U.S. PATENT DOCUMENTS

| | | | |
|---|---|---|---|
| 4,538,786 | 9/1985 | Manning | 248/544 |
| 4,659,051 | 4/1987 | Propp et al. | 248/546 |
| 4,717,099 | 1/1988 | Hubbard | 248/57 |
| 4,892,211 | 1/1990 | Jorgensen | 220/3.2 |
| 4,909,405 | 3/1990 | Kerr, Jr. | 220/3.9 |
| 4,967,990 | 11/1990 | Rinderer | 248/205.1 |
| 5,044,582 | 9/1991 | Walters | 248/57 |
| 5,060,892 | 10/1991 | Dougherty | 248/57 |
| 5,074,515 | 12/1991 | Carter, Jr. | 248/546 |
| 5,085,393 | 2/1992 | Ryan | 248/343 |
| 5,183,233 | 2/1993 | LaPalomento | 248/343 |
| 5,242,269 | 9/1993 | Chang | 416/244 |
| 5,303,894 | 4/1994 | Deschamps et al. | 248/343 |
| 5,385,323 | 1/1995 | Garelick | 248/161 |
| 5,386,959 | 2/1995 | Laughlin et al. | 248/205.1 |
| 5,480,053 | 1/1996 | Jorgensen | 220/62 |
| 5,672,003 | 9/1997 | Shemitz et al. | 362/396 |
| 5,934,631 | 8/1999 | Beckee et al. | 248/200.1 |
| 5,938,157 | 8/1999 | Reiker | 248/200.1 |

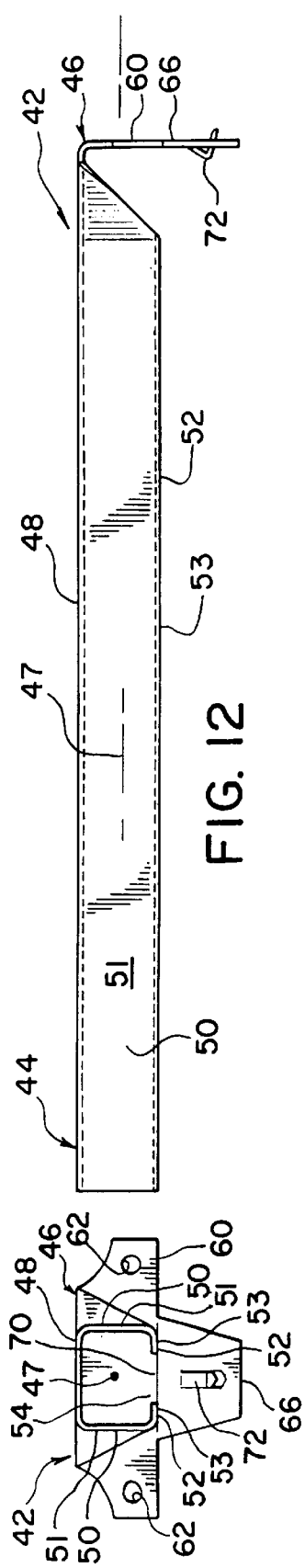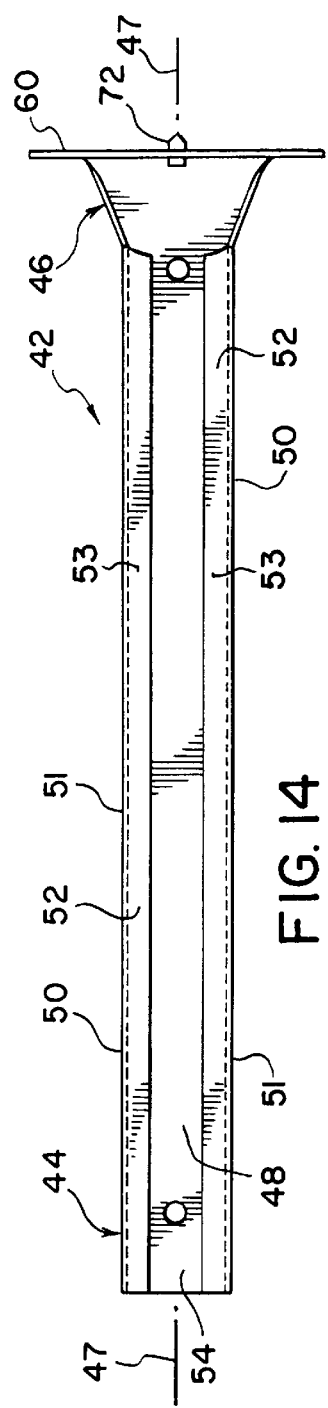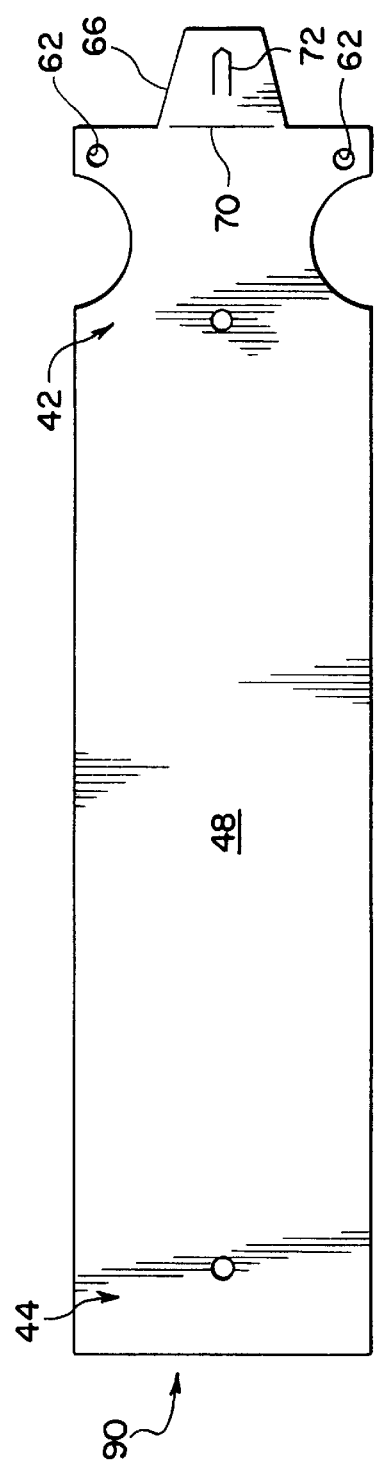
FIG. 12
FIG. 13
FIG. 14
FIG. 15

MOUNTING BRACKET AND SUPPORTING BRACE

BACKGROUND OF THE INVENTION

Presently, the National Electrical Code permits ceiling light fixtures up to 50 pounds and ceiling fans up to 35 pounds. However, impending changes to the code will increase the acceptable weight of ceiling light fixtures to 80 pounds and the acceptable weight of ceiling fans to 70 pounds. Although various supports for supporting outlet boxes have been developed, the prior art devices were not designed for supporting the increased loading associated with the heavier lighting fixtures and ceiling fans. Thus, there is a need in the art for structures capable of supporting the heavier lighting fixtures and ceiling fans, especially structures that can be positioned between joists.

Examples of prior art supporting structures are disclosed in the following U.S. Pat. No. ; 2,925,236 to Cook et al.; U.S. Pat. No. 2,945,661 to Appleton; U.S. Pat. No. 3,214,126 to Roos; U.S. Pat. No. 3,518,421 to Cogdill; U.S. Pat. No. 4,037,098 to Kowalski; to U.S. Pat. No. 4,050,603 to Harris et al.; U.S. Pat. No. 4,538,786 to Manning; U.S. Pat. No. Re. 33,147 to Reiker, U.S. Pat. No. 4,909,405 to Kerr, Jr.; U.S. Pat. No. 5,044,582 to Walters; and U.S. Pat. No. 5,303,894 to Deschamps et al.

Thus, there is a continuing need to provide an improved supporting structure, especially for supporting lighting fixtures and ceiling fans weighing up to 80 pounds and 70 pounds, respectively. This invention addresses these needs in the art as well as other needs, which will become apparent to those skilled in the art once given this disclosure.

SUMMARY OF THE INVENTION

One object of the present invention is to provide an improved supporting structure.

Still another object of the invention is to provide a structure for supporting lighting fixtures and ceiling fans, or electrical boxes for supporting fixtures and fans.

Yet another object of the invention is to provide a structure for supporting lighting fixtures and ceiling fans, which are heavier than previously permitted.

A further object of the invention is to provide a bracket for reinforcing a brace.

Still a further object of the invention is to provide a bracket for reinforcing and locking a telescoping brace.

The foregoing objects are basically attained by providing a bracket comprising: a first portion having a first central axis in a first plane and a second central axis extending substantially perpendicular to the first central axis and being in a second plane, first and second sides, each of the first and second sides being spaced from the first central axis and facing outwardly from the first central axis, the first side facing in a first direction substantially perpendicular to the first central axis and the second side facing in a second direction substantially perpendicular to the first central axis and substantially parallel to and opposite to the first direction, the first plane being positioned between the first and second sides, and a third side facing in a third direction substantially perpendicular to both the first and second central axes, the first portion further having a coupling element adapted to attach the bracket to a supported element; and a first extension coupled to the first portion and having fourth and fifth sides, each of the fourth and fifth sides being spaced from the first central axis and facing inwardly toward the first central axis, the fourth side facing in the second direction and the fifth side facing in the first direction, and a sixth side facing in a fourth direction substantially parallel to and opposite to the third direction, the first and fourth sides being separated from the second and fifth sides by the first plane, the sixth side being spaced further from the first central axis than the third side in the third direction, and the first portion and the first extension being integrally formed as a one-piece, unitary member.

The foregoing objects are also attained by providing supporting structure, comprising: a brace having an inside section, an outside section with a pair of vertical portions, and a slot extending through the inside and outside sections; a bracket coupled to the inside section of the brace and to each of the vertical portions of the outside section; and a coupling member attached to the bracket and adapted to secure a supported member against the brace to prohibit relative movement between the brace and the bracket.

The foregoing objects are further attained by providing a supporting structure, comprising a brace having a hollow, elongated member with a longitudinal axis, an inside section, an outside section, and an elongated slot extending through the inside and outside sections; and a bracket having a first portion positioned within the elongated member and being directly connected to the inside section of the elongated member and a first extension attached to the first portion, extending through the elongated slot, and being directly connected to the outside section of the elongated member, the first portion and the first extension being integrally formed as a one-piece, unitary member, and the first portion further having a coupling element adapted to attach the bracket to a supported element.

The foregoing objects are further attained by providing a supporting structure, comprising: a brace having a hollow, elongated member with a longitudinal axis, an inside section with a horizontal bottom, an outside section with first and second vertical sides, and an elongated slot extending through the inside and outside sections; and a bracket having a first portion with first and second ends and a base, the first portion positioned within the elongated member and the base directly abutting the bottom of the brace, the bracket further having first and second extensions attached to the first and second ends of the first portion, respectively, the first extension being spaced from the second extension in a direction substantially parallel to the longitudinal axis, each of the first and second extensions extending through the elongated slot and having a pair of vertical stiffeners, one of the stiffeners of each of the pair of stiffeners directly abutting the first vertical side of the brace, and another of the stiffeners of each of the pair of stiffeners directly abutting the second vertical side of the brace, and the first portion further having a coupling element adapted to attach the bracket to a supported element.

The foregoing objects are still further attained by providing a supporting structure, comprising: a brace having a hollow, elongated member with a longitudinal axis, an inside section, an outside section, and an elongated slot extending through the inside and outside sections; and a bracket having a first portion positioned within the elongated member and being directly connected to the inside section of the elongated member and a first extension attached to the first portion, the first extension extending through the elongated slot and being directly connected to the outside section of the elongated member, the first portion further having a plurality of coupling elements adapted to attach the bracket to a supported element, each of the plurality of coupling elements being spaced in a first direction substantially parallel to the longitudinal axis.

Other objects, advantages, and salient features of the invention will become apparent to those skilled in the art from the following detailed description, which, taken in conjunction with the annexed drawings, discloses preferred embodiments of the invention.

BRIEF DESCRIPTION OF THE DRAWINGS

Referring now to the attached drawings which form a part of this original disclosure.

FIG. 12 is a front view of one of the channels of the brace in accordance with the present invention;

FIG. 13 is a side elevational view of one of the channels of the brace in accordance with the present invention;

FIG. 14 is a bottom view of one of the channels of the brace in accordance with the present invention;

FIG. 15 is a plan view of an unfolded blank used to form one of the channels of the brace in accordance with the present invention;

DETAILED DESCRIPTION OF THE PREFERRED EMBODIMENTS

Figure 1:
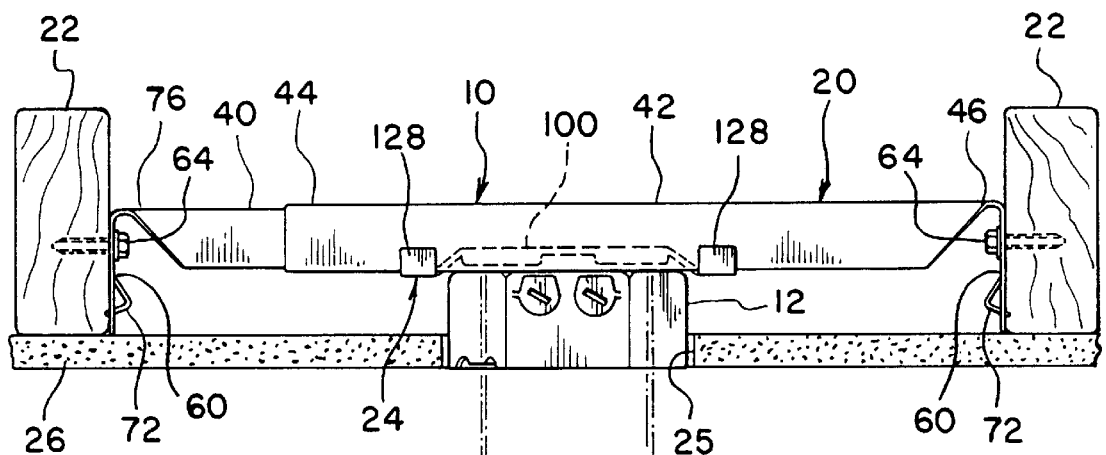
Fig. 1 is a side elevational view of a brace and a bracket in accordance with the present invention, which is positioned between joists and is supporting an electrical junction box.

As seen in FIG. 1, a supporting structure 10 in accordance with the present invention is illustrated. Although supporting structure 10 can be use to support various apparatus, it preferably supports an electrical junction box 12 attached to a ceiling fan or lighting fixture 14.

Supporting structure 10 includes a brace 20 that is positioned between two joists 22 and a bracket 24. Junction box 12 is secured to bracket 24 and the location of supporting structure 10 on joists 22 permits junction box 12 to extend through an opening 25 in wall board 26.

Brace 20 has two telescoping channels 40 and 42. Channels 40 and 42 are substantially identical to each other except that channel 40 is dimensioned smaller than channel 42. This permits channel 40 to be received within channel 42 in a telescoping manner, i.e., channel 40 can move relative to channel 42 while being inserted within channel 42. This feature enables brace 20 to be positioned between joists 22 that are spaced various distances apart. Thus, one brace 20 can be made to accommodate a variety of joist spacing.

Since channels 40 and 42 are substantially identical, only channel 42 will be described in detail. Channel 42 has a telescoping end 44 and an attaching end 46, and extends along a longitudinal axis 47. Although channels 40 and 42 can take various shapes, telescoping end 44 has a substantially planar top 48, two substantially planar sides 50, and a substantially planar bottom 52 with an elongated slot 54 extending completely through bottom 52. Each of sides 50 are substantially parallel and are substantially perpendicular to top 48 and to bottom 52. Top and bottom 52 are substantially parallel to each other and are substantially perpendicular to sides 50. Additionally, each side 50 has an outer vertical surface 51, and each bottom 52 has a lower horizontal surface 53.

Attaching end 46 has a plate 60 and holes 62 extending therethrough to receive mounting fasteners 64; such as, mounting screws. Mounting screws 64 rigidly couple brace 20 to joists 22 as is known in the art. Once channels 40 and 42 are rigidly secured to joists 22, channels 40 and 42 are prohibited from moving relative to each other. Preferably, mounting screws 64 are one inch long 12–14 type AB threaded tapping screws. A tab 66 extends from the bottom of plate 60 to aid in the positioning of brace 20 relative to wall board 26.

Figure 16:
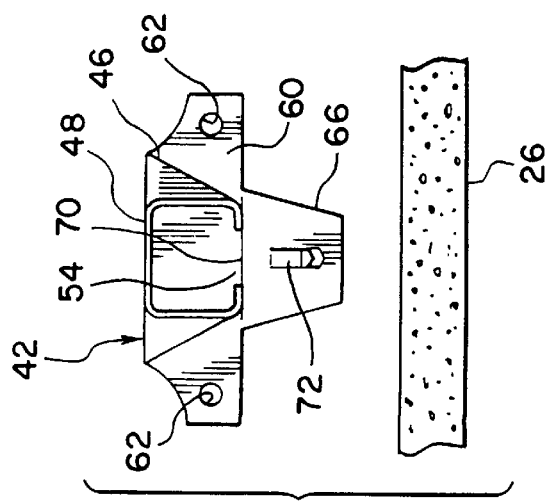
FIG. 16 is a side elevational view of one of the channels of the brace in accordance with the present invention located in a first position with respect to a section of wall board.

Since brace 20 can accommodate junction boxes of various shapes and sizes, brace 20 must be capable of being placed at various distances from wall board 26 when junction boxes of various depths are used. As seen in FIGS. 16, if a deep junction box 12; for example, 2⅛ inches deep, is used with brace 20, tab 66 can be spaced from wall board 26 to accommodate this specific junction box. Additionally, tab 66 can be specifically sized to correspond to a junction box 12 of a specific depth. For instance, if a junction box having a depth of 1½ inches is used, tab 66 can be sized so that brace 20 can be positioned such that the bottom of tab 66 is flush against wall board 26. This facilitates placement of brace 20 on joists 22 for certain sized boxes. Further, tab 66 can aid in the placement of brace 20 when more shallow junction boxes 12 are used. For example, junction boxes 12 that are ½ inch deep. In particular, a score 70 positioned where tab 66 meets plate 60, enables tab 66 to be broken and separated from plate 60. Then, channel 42 can be placed flush against wall board 26.

Tab 66 also has a nailing spur 72 that can be hammered into joist 22 to temporarily support plate 60 against joist 22 while securing plate to joist 22 with mounting screws 64.

Figure 3:
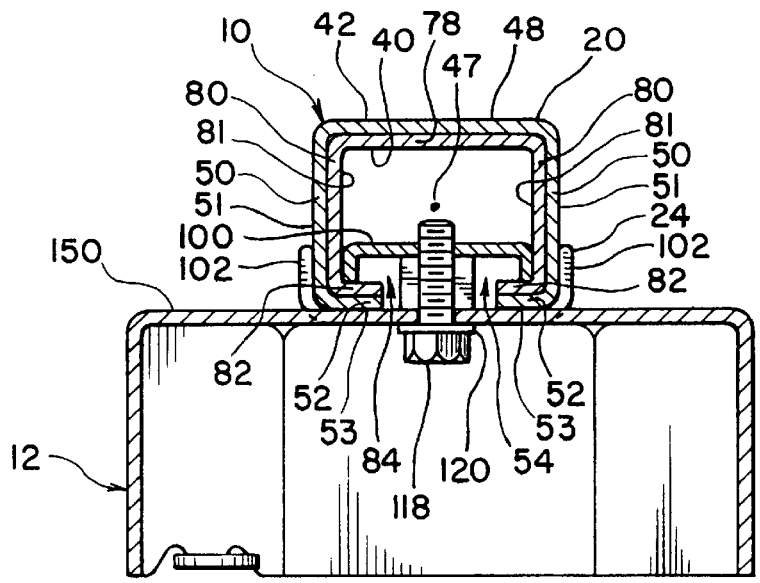
FIG. 3 is a cross-sectional view of the brace and bracket in accordance with the present invention supporting a junction box, taken along line 3-3 of FIG. 2.

As seen in FIG. 3, channel 40 has a top 78, two sides 80, and a bottom 82 with an elongated slot 84 extending therethrough. Also, each side 80 has an inner vertical surface 81. Channel 40 is substantially identical to channel 42, except that the sizes and spacing of top 78, sides 80, and bottom 82 are changed to allow channel 40 to easily slide within channel 42. As seen in FIG. 3, when channel 40 is positioned within and received by channel 42, that portion of channel 40 within channel 42 is completely received within channel 42.

Channels 40 and 42 are each preferably formed by being folded from a single, unitary member, for example, by being folded from a single, substantially flat blank of material. Blank 90, as seen in FIG. 15, can be folded to form channel 42. Since channels 40 and 42 are substantially identical as discussed above, the blank used to form channel 40 is substantially identical to blank 90, except that the width of the blank may be less than that of channel 42, to form the smaller top 78, sides 80, and bottom 82. The same blank 90 can be use for both channels 40 and 42, if channel 40, i.e., the smaller channel, is folded differently to enable it to be inserted into channel 42. The different fold for channel 40 would also vary as a result of the different folding. The general use of and folding of blanks to form structures is known in the art. Although any number of materials can be used, preferably, blank 90 is a metallic material; such as galvanized .039 sheet steel.

Bracket 24 has a main portion 100, two extensions 102, a longitudinal axis 104 in a vertical plane 105, and a transverse axis 106 in a horizontal plane 107. Main portion 100 has a top 110 and two pairs of substantially parallel and opposite sides 112. Top 110 is substantially planar and has two, opposite ends 114 spaced along longitudinal axis 104. Each side 112 is substantially perpendicular to top 110 and has a vertical surface 113 facing away from longitudinal axis 104 in a direction that is substantially parallel to transverse axis 106, and a lower horizontal surface 115 facing downwards. Main portion 100 also has coupling elements 116 for connecting with junction box 12 or a fan or fixture bracket. Coupling elements are preferably threaded holes for receiving box mounting screws 118, although they can be any device to capture the fastening device used to secure junction box 12 to bracket 24. Preferably, two holes 116 are used to provide a more secure and rigid connection between junction box 12 and bracket 24. Further, box mounting screws 118 are preferably ¾ inch long 12–24 screws with a lockwasher 120 as seen in FIG. 1.

Figure 6:
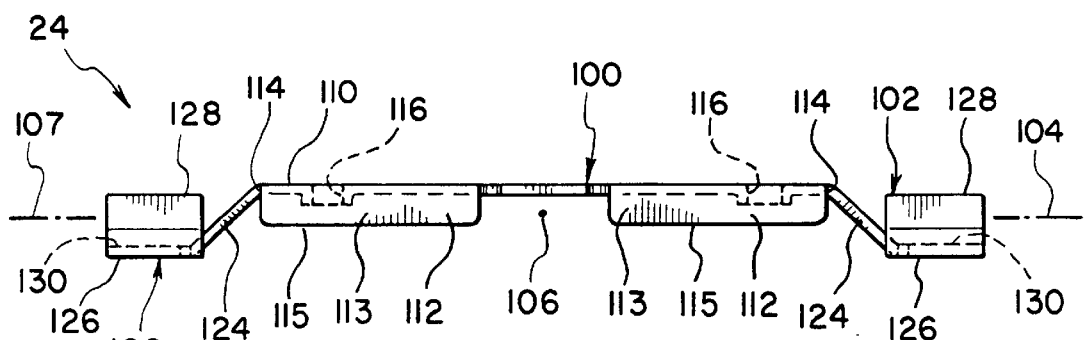
FIG. 6 is a front elevational view of the bracket in accordance with the present invention.
Figure 7:
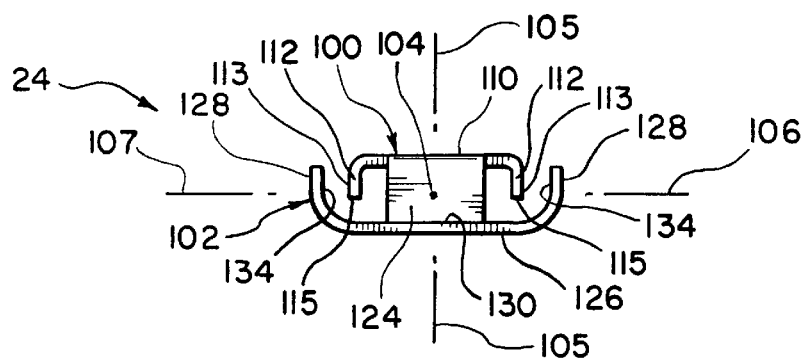
FIG. 7 is a side elevational view of the bracket in accordance with the present invention.
Figure 8:
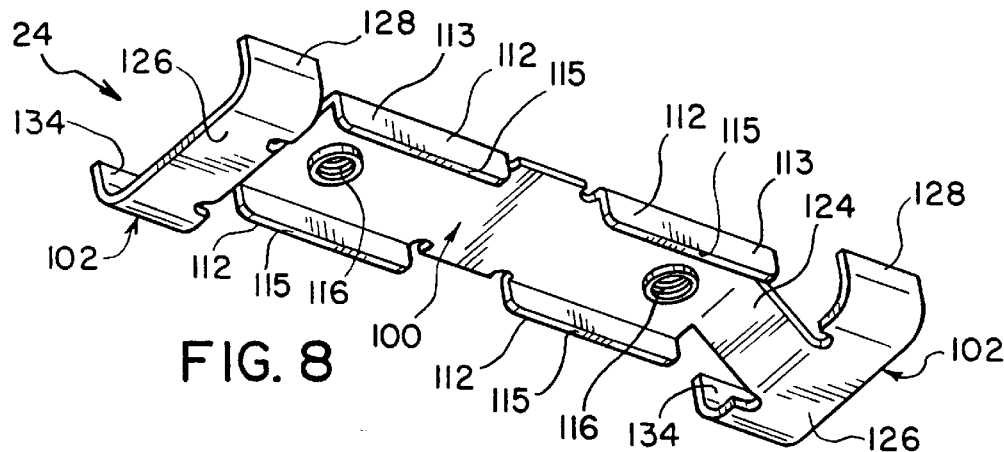
FIG. 8 is a bottom-front-side perspective view of the bracket in accordance with the present invention.
Figure 9:
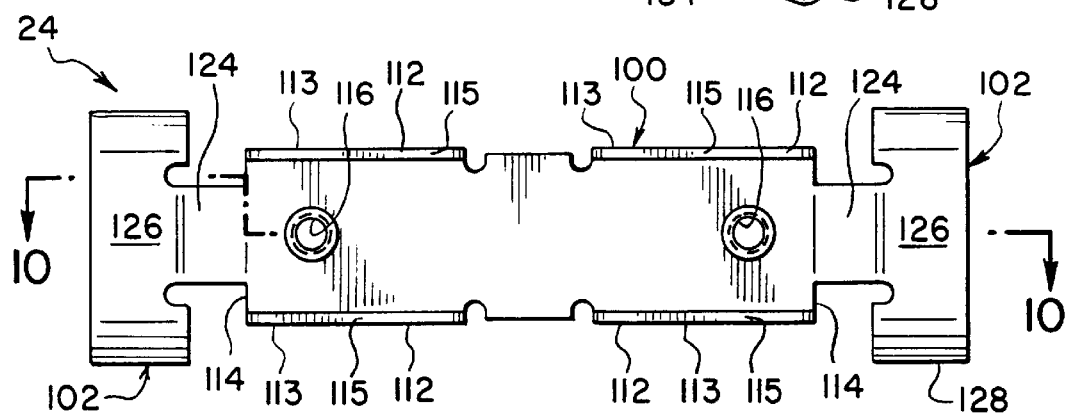
FIG. 9 is a bottom view of the bracket in accordance with the present invention.
Figure 10:
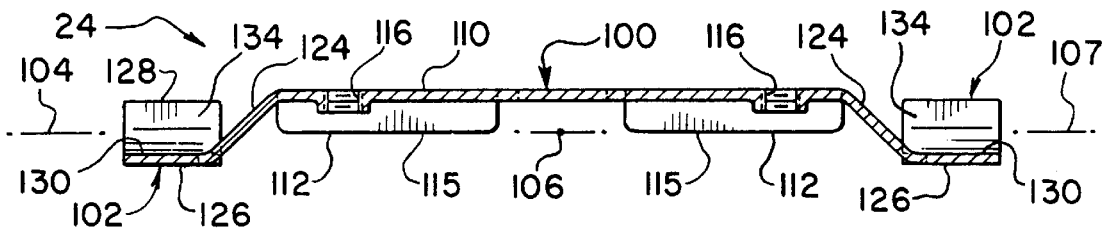
FIG. 10 is a cross-sectional view of the bracket in accordance with the present invention taken along line 10—10 of FIG. 9.

Holes 116 are preferably extruded. Although holes 116 are illustrated as extending downwardly in the direction of extensions 102 in, for example, FIG. 6, it may be preferred to form holes 116 extending upwardly, in a direction away from extensions 102 and opposite to the direction illustrated in FIG. 6.

Extensions 102 are located at each end 114 of main portion 100. Each extension 102 has an inclined narrow strip 124 that attaches to a bottom 126, which is substantially planar. Preferably, the inclination of strip 124 relative to longitudinal axis 104 is approximately 45 degrees. Each bottom 126, in turn, has two substantially parallel sides 128, which are substantially perpendicular to bottom 126 and extend upwardly. Bottom 126 has an upper horizontal surface 130 and each side 128 has an inner vertical surface 134, each facing each other.

Figure 11:
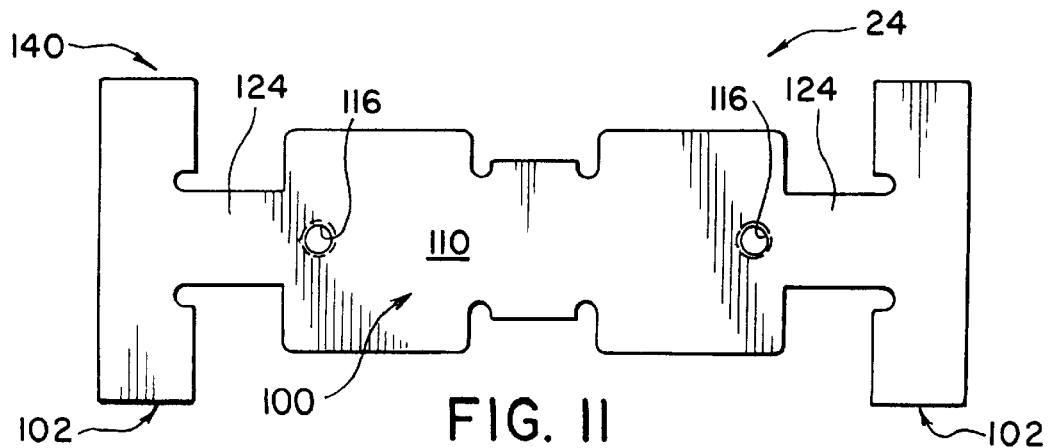
FIG. 11 is a plan view of an unfolded blank used to form the bracket in accordance with the present invention.

Bracket 24, like brace 20 is preferably formed by being folded from a single, unitary member, for example, a substantially flat blank 140 of material. Blank 140, as seen in FIG. 11, can be folded to form bracket 24 in a manner similar to the folding of channels 40 and 42. Preferably, blank 140 is a metallic material; such as galvanized 0.0625 sheet steel. Thus, blank 140 for bracket 24 is thicker than blank 90 for channels 40 and 42.

Bracket 24 is sized to fit inside channel 40 in order to act as a lock to stop relative movement of bracket 24 and channels 40 and 42, while also extending outside channel 42 to help prevent sides 50 from spreading outwardly due to increased downward loading by ceiling fan or lighting fixture 14. The location of extensions 102 against the outer vertical surfaces 51 provides the mechanism for prohibiting sides of channels 40 and 42 from spreading apart. Additionally, since bracket 24 can be positioned anywhere along brace 20, this reinforcement of channels 40 and 42 travels to the area of brace 20 where it is needed most.

Accordingly, the distance between outer vertical surfaces 113 of main portion 100 is slightly less than the distance between inner vertical surfaces 81 of channel 40. Additionally, the distance between inner vertical surfaces 134 of each extension 102 is slightly greater than the distance between outer vertical surfaces 51 of channel 42. Bracket 24 is sized to easily, but snugly fit with inner channel 40, and to easily, but snugly receive outer channel 42.

Also, although main portion 100 of bracket 24 is spaced along longitudinal axis 104 from extensions 102, the horizontal dimensions of these elements are related to each other to permit insertion of bracket 24 into channel 40 and to permit the insertion of channel 40 and bracket 24 into channel 42. In particular, each lower horizontal surface 115 of main portion 100 and each upper horizontal surfaces 130 of extensions 102 are spaced a distance slightly greater than the combined thickness of bottoms 82 and 52 of channels 40 and 42, respectively, in a direction substantially perpendicular to longitudinal axis 104.

Figure 2:
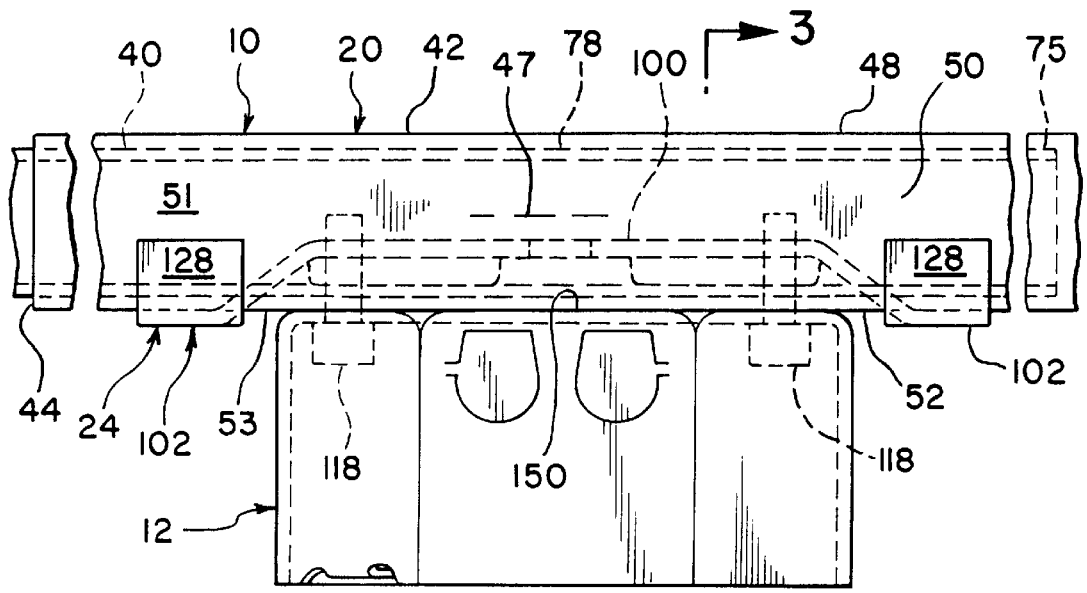
FIG. 2 is an enlarged, partial view of FIG. 1 illustrating the brace and bracket in accordance with the present invention, supporting a junction box.

The spacing of extensions 102 along longitudinal axis 104 is also important. As seen in FIGS. 1 and 2, extensions 102 are spaced apart a distance greater than the width of junction box 12. This enables the top 150 of junction box 12 to directly abut lower horizontal surface 53 of channel 42, or the bottom 82 of channel 40, or portions of both surface 53 of channel 42 and bottom 82 of channel 40, depending on how bracket 24 is situated with respect to each channel 40 and 42. Then, upon the tightening of box mounting screws 118, bottoms 82 and 52 of channels 40 and 42 are sandwiched between surfaces 115 of sides 112 of bracket 24 and top 150 of junction box 12. Thus, not only is junction box 12 securely and rigidly connected to bracket 24 and brace 20, but bracket 24 is prohibited from moving relative to channels 40 and 42, and is securely and rigidly fixed in a single position. This allows the once adjustable brace 20 and bracket 24 to become a rigid supporting structure 10 for junction box 12.

The structure and function of junction box 12 is known in the art and therefore will not be described here in great detail. Junction box 12 preferably has mounting screws 152 for mounting lighting fixture or ceiling fan 14 securely thereto. Junction box 12 can be any known junction box; such as that described in U.S. Pat. No. 4,892,211 to Jorgensen. Accordingly, U.S. Pat. No. 4,892,211 to Jorgensen is hereby incorporated herein by reference.

Figure 4:
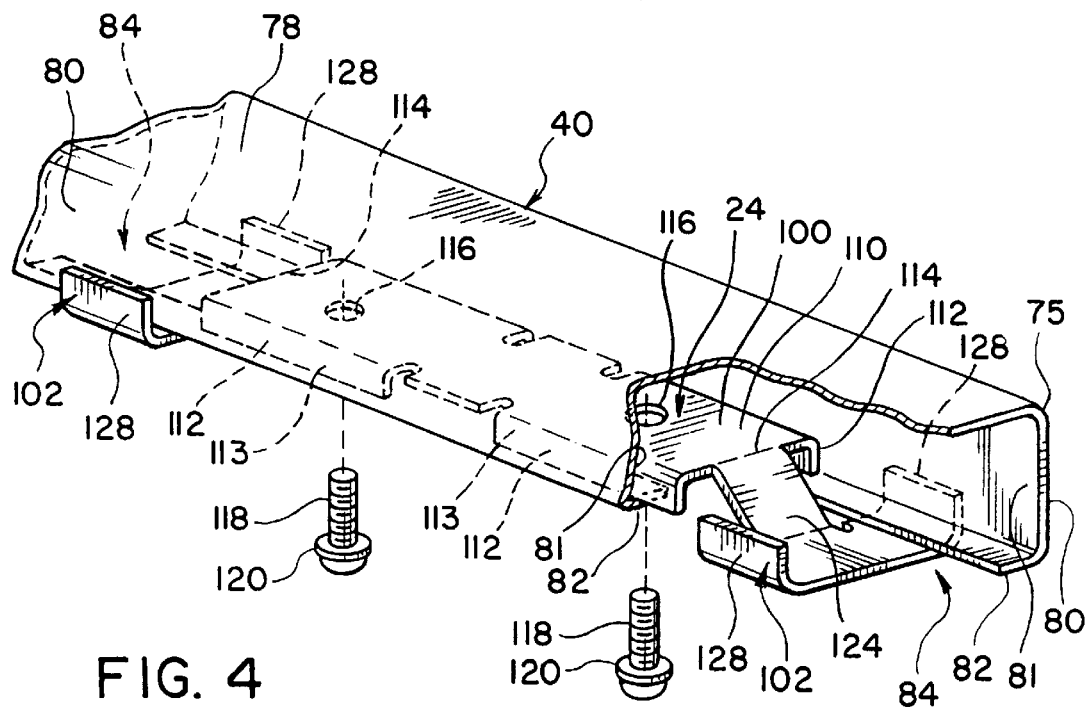
FIG. 4 is a top-side perspective view of the bracket in accordance with the present invention within one of the telescoping channels of the brace in accordance with the present invention.
Figure 5:
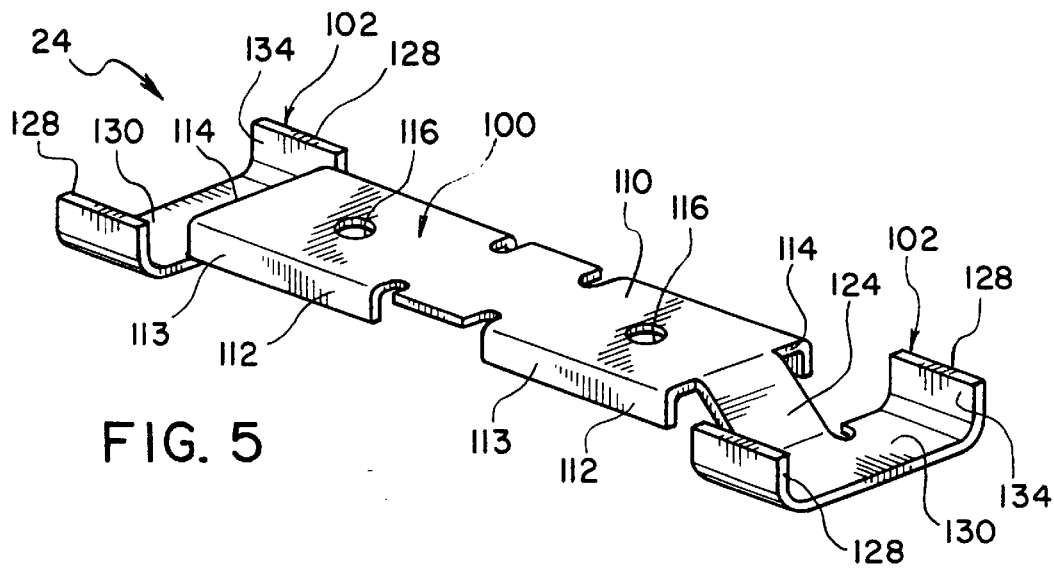
FIG. 5 is a top-front-side perspective view of the bracket in accordance with the present invention.

Although supporting structure 10 has many uses, preferably it is used as follows. Main portion 100 of bracket 24 is positioned within channel 40 as seen in FIG. 4. Main portion 100 of bracket 24 and channel 40 are then inserted into telescoping end 44 of channel 42 so that extensions 102 of bracket 24 remain outside channel 42 as seen in FIG. 3. At this point, channels 40 and 42 and bracket 24 are snugly interconnected while each is capable of easily moving relative to each in a direction substantially parallel to longitudinal axis 47.

Figure 18:
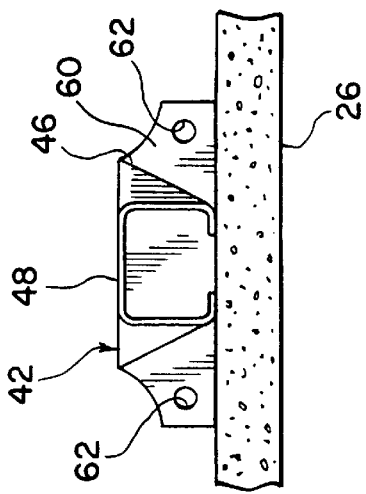
FIG. 18 is a side elevational view of one of the channels of the brace in accordance with the present invention located in a third position with respect to a section of wall board.
Figure 17:
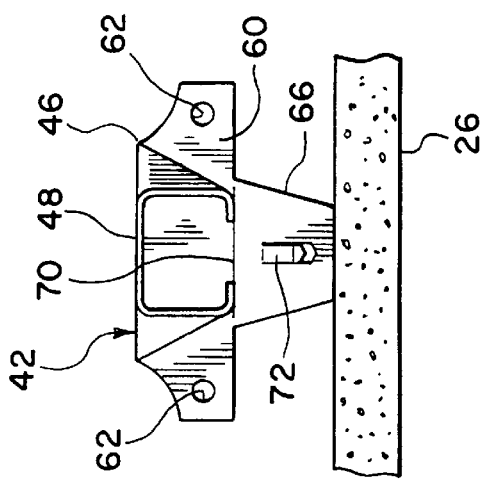
FIG. 17 is a side elevational view of one of the channels of the brace in accordance with the present invention located in a second position with respect to a section of wall board.

Junction box 12 is then loosely connected to bracket 24 by mounting screws 118. Supporting structure 10 is then placed between two joists 22 and channels 40 and 42 are moved relative to each other so that each attaching end 46 and 76 of channels 42 and 40 can abut a joist 22. The depth of junction box 12 being known, tab 65 is either removed or left in place and the positioning of brace 20 relative to wall board 26 is accomplished in one of the orientations illustrated FIGS. 16–18. Channels 40 and 42 are then rigidly secured to joists 22 by mounting screws 64.

Once channels 40 and 42 are secured to joists 22, they do not normally move relative to each other, however, bracket 24 is capable of moving relative to each of the fixed channels 40 and 42. This enables the precise positioning of bracket 24, where desired. Then, junction box 12 is rigidly secured to mounting bracket 24 by tightening box mounting screws 118. Upon tightening screws 118, top 150 of junction box 12, bracket 24, and either one or both of channels 40 and 42 are compressed together to form a rigid assembly. Thus, bracket 24 and junction box 12 are rigidly fixed with respect to channels 40 and 42 and joists 22.

Although bracket 24 is illustrated and described as being used with telescoping channels 40 and 42 and supporting either a ceiling fan or a lighting fixture 14, it should be understood that bracket 24 can be used with structures other than telescoping channels, and can support apparatus other than ceiling fans and lighting fixtures For example, bracket 24 can be used with a single, fixed channel and can support any appropriately sized item intended to be supported by that fixed channel.

Additionally, bracket 24 can be positioned anywhere along channels 40 and 42. For example, bracket 24 can be positioned entirely on channel 40, or entirely on channel 42, or partly on one of channels 40 and 42 and partly on the other of channels 40 and 42, or entirely on both channels 40 and 42 simultaneously, providing there exists sufficient overlap.

While an advantageous embodiment has been chosen to illustrate the invention, it will be understood by those skilled in the art from this disclosure that various changes and modifications can be made therein without departing from the scope of the invention as defined in the appended claims.

What is claimed is:

1. A supporting structure, comprising:

a brace having an inside section, an outside section with a pair of vertical portions, and a slot extending through said inside and outside sections;

a one-piece, unitary bracket coupled to said inside section of said brace and to each of said vertical portions of said outside section; and a coupling member attached to said bracket and adapted to secure a supported member against said brace to prohibit relative movement between said brace and said bracket.

2. A supporting structure comprising:

a brace having an inside section, an outside section with a pair of vertical portions, and a slot extending through said inside and outside sections;

a bracket coupled to said inside section of said brace and to each of said vertical portions of said outside section; and a coupling member attached to said bracket and adapted to secure a supported member against said brace to prohibit relative movement between said brace and said bracket, said inside section and said outside section of said brace being adapted to move relative to each other, said inside section being positioned completely within said outside section, each of said inside and outside sections being C-shaped in cross-section.

3. A supporting structure comprising:

a brace having an inside section, an outside section with a pair of vertical portions, and a slot extending through said inside and outside sections;

a bracket coupled to said inside section of said brace and to each of said vertical portions of said outside section; and a coupling member attached to said bracket and adapted to secure a supported member against said brace to prohibit relative movement between said brace and said bracket, said bracket having a first portion with first and second ends, said first and second ends being coupled to first and second extensions, respectively, by first and second narrow sections, respectively, said first portion having a bottom directly coupled to said inside section of said brace, each of said first and second extensions having a vertical section for directly abutting one of said pair of vertical portions of said brace, and said bracket being integrally formed as a one-piece, unitary member.

4. A supporting structure according to claim 14, wherein said coupling member comprises a plurality of threaded fasteners, and said bracket has a plurality of openings extending completely therethrough, each of said plurality of openings adapted to receive one of said plurality of threaded fasteners.

5. A supporting structure, comprising:

a brace having a hollow, elongated member with a longitudinal axis, an inside section, an outside section, and an elongated slot extending through said inside and outside sections; and a bracket having a first portion positioned within said elongated member and being directly connected to said inside section of said elongated member and a first extension attached to said first portion, extending through said elongated slot, and being directly connected to said outside section of said elongated member, said first portion and said first extension being integrally formed as a one-piece, unitary member, and said first portion further having a coupling element adapted to attach said bracket to a supported element.

6. A supporting structure according to claim 5, wherein said inside section and said outside section of said elongated member are adapted to move relative to each other along said longitudinal axis.

7. A supporting structure according to claim 6, wherein said inside section is positioned completely within said outside section.

8. A supporting structure according to claim 7, wherein each of said inside and outside sections are C-shaped in cross-section.

9. A supporting structure, comprising:

a brace having a hollow, elongated member with a longitudinal axis, an inside section with a horizontal bottom, an outside section with first and second vertical sides, and an elongated slot extending through said inside and outside sections; and a one-piece, unitary bracket having a first portion with first and second ends and a base, said first portion positioned within elongated member and said base directly abutting said bottom of said brace, said bracket further having first and second extensions attached to said first and second ends of said first portion, respectively, said first extension being spaced from said second extension in a direction substantially parallel to said longitudinal axis, each of said first and second extension extending through said elongated slot and having a pair of vertical stiffeners, one of said stiffeners of each of said pair of stiffeners directly abutting said first vertical side of said brace, and another of said stiffeners of each of said pair of stiffeners directly abutting said second vertical side of said brace, and said first portion further having a coupling element adapted to attach said bracket to a supported element.

10. A supporting structure comprising:

a brace having a hollow, elongated member with a longitudinal axis, an inside section with a horizontal bottom, an outside section with first and second vertical sides, and an elongated slot extending through said inside and outside sections; and a bracket having a first portion with first and second ends and a base, said first portion positioned within elongated member and said base directly abutting said bottom of said brace, said bracket further having first and second extensions attached to said first and second ends of said first portion, respectively, said first extension being spaced from said second extension in a direction substantially parallel to said longitudinal axis, each of said first and second extension extending through said elongated slot and having a pair of vertical stiffeners, one of said stiffeners of each of said pair of stiffeners directly abutting said first vertical side of said brace, and another of said stiffeners of each of said pair of stiffeners directly abutting said second vertical side of said brace, and said first portion further having a coupling element adapted to attach said bracket to a supported element, said inside section and said outside section of said elongated member being adapted to move relative to each other along said longitudinal axis.

11. A supporting structure according to claim 10 wherein said inside section is positioned completely within said outside section.

12. A supporting structure according to claim 11, wherein each of said inside and outside sections are C-shaped in cross-section.

13. A supporting structure according to claim 9, wherein said first and second extensions are coupled to said first portion by first and second narrow strips.

14. A supporting structure according to claim 9, wherein said coupling element includes at least one opening for receiving a fastener.

15. A supporting structure according to claim 14, wherein said at least one opening is a plurality of openings.

16. A supporting structure according to claim 15, wherein said plurality of openings are threaded openings extending completely through said first portion.

17. A supporting structure according to claim 9, wherein said first portion and said first extension are formed from a single sheet of metal.

18. A supporting structure, comprising:

a brace having a hollow, elongated member with a longitudinal axis, an inside section, an outside section, and an elongated slot extending through said inside and outside sections; and a one-piece, unitary bracket having a first portion positioned within said elongated member and being directly connected to said inside section of said elongated member and a first extension attached to said first portion, said first extension extending through said elongated slot and being directly connected to said outside section of said elongated member, said first portion further having a plurality of coupling elements adapted to attach said bracket to a supported element, each of said plurality of coupling elements being spaced in a first direction substantially parallel to said longitudinal axis.

19. A supporting structure comprising:

a brace having a hollow, elongated member with a longitudinal axis, an inside section, an outside section, and an elongated slot extending through said inside and outside sections; and a bracket having a first portion positioned within said elongated member and being directly connected to said inside section of said elongated member and a first extension attached to said first portion, said first extension extending through said elongated slot and being directly connected to said outside section of said elongated member, said first portion further having a plurality of coupling elements adapted to attach said bracket to a supported element, each of said plurality of coupling elements being spaced in a first direction substantially parallel to said longitudinal axis, said first portion and said first extension [are] being integrally formed as a one-piece, unitary member.

20. A supporting structure according to claim 19, wherein said first portion and said first extension are formed from a single sheet of metal.

21. A supporting structure according to claim 18, wherein said first portion has first and second ends, said first extension is coupled to said first end of said first portion, and a second extension is coupled to said second end of said first portion, said second extension being opposite said first extension and being a mirror image of said first extension.

22. A supporting structure according to claim 21, wherein said first and second extensions are coupled to said first portion by first and second narrow strips.

23. A supporting structure according to claim 18, wherein said plurality of coupling elements is a plurality of openings.

24. A supporting structure according to claim 23, wherein said plurality of openings are threaded openings extending completely through said first portion.

25. A supporting structure comprising:

a brace having a hollow, elongated member with a longitudinal axis, an inside section, an outside section, and an elongated slot extending through said inside and outside sections; and a bracket having a first portion positioned within said elongated member and being directly connected to said inside section of said elongated member and a first extension attached to said first portion, said first extension extending through said elongated slot and being directly connected to said outside section of said elongated member, said first portion further having a plurality of coupling elements adapted to attach said bracket to a supported element, each of said plurality of coupling elements being spaced in a first direction substantially parallel to said longitudinal axis, said inside section and said outside section of said elongated member being adapted to move relative to each other along said longitudinal axis.

26. A supporting structure according to claim 25, wherein said inside section is positioned completely within said outside section.

27. A supporting structure according to claim 26, wherein each of said inside and outside sections are C-shaped in cross-section.

* * * * *